Sept. 3, 1957    A. V. HUMPHREY    2,804,788
GAUGE FOR DOWELS
Filed Sept. 27, 1955

INVENTOR.
Albert V. Humphrey
BY
Att'y

United States Patent Office 2,804,788
Patented Sept. 3, 1957

2,804,788

GAUGE FOR DOWELS

Albert V. Humphrey, Dorris, Calif.

Application September 27, 1955, Serial No. 536,870

1 Claim. (Cl. 77—62)

This invention relates to improvements in tools and has particular reference to a gauge for the use of positioning dowels.

The principal object of this invention is to provide a gauge for the drilling of holes in a surface which holes will receive dowels and provide means whereby similar holes will match the dowel positions.

A further object is to provide a tool which is simple to construct, one which may have universal use, one which is readily transportable, and one which may be adjusted to suit drills of various sizes.

Other objects and advantages will be apparent during the course of the following description.

In the accompanying drawings forming a part of this specification and in which like numbers are employed to designate like parts throughout the same:

Figure 1:
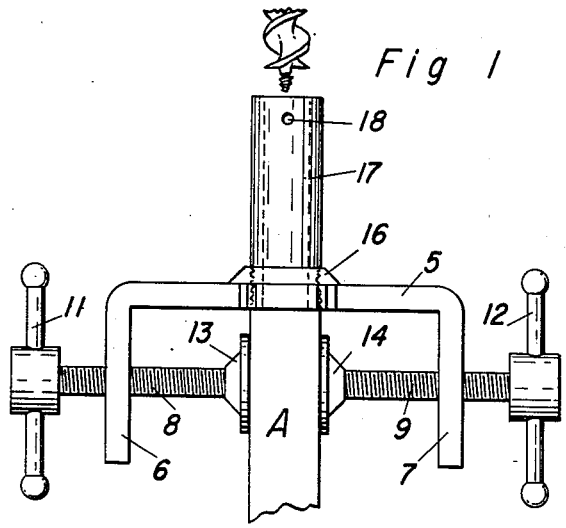
Fig. 1 is a side elevation of my device as the same would appear in use.
Figure 2:
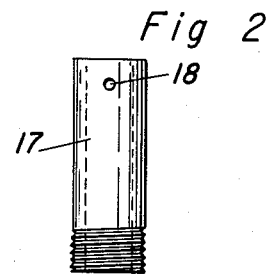
Fig. 2 is one of the drill tubes.

Many objects are fitted together through the use of dowels, or pins made of wood and inserted in holes drilled in both of the pieces to be joined.

It is therefore necessary that the dowels be vertically arranged in the surface of the pieces and consequently that the holes which are drilled in the pieces be properly spaced and in proper alignment.

In the accompanying drawings, wherein for the purpose of illustration is shown a preferred embodiment of my invention, the numeral 5 designates a U-shaped clamping member in the legs 6 and 7 of which are rotatably positioned clamping members 8 and 9 respectively. These clamping members are rotated through the use of handles 11 and 12 respectively, so that the pressure plates 13 and 14 respectively will bear upon the opposite sides of a piece of work designated by the letter A.

Mounted in the top of the U-shaped member is a threaded collar 16, in which is threaded a drill tube 17. An opening 18 permits a nail to be passed therethrough for the purpose of securing leverage in placing and removing tubes of different sizes.

Figure 3:
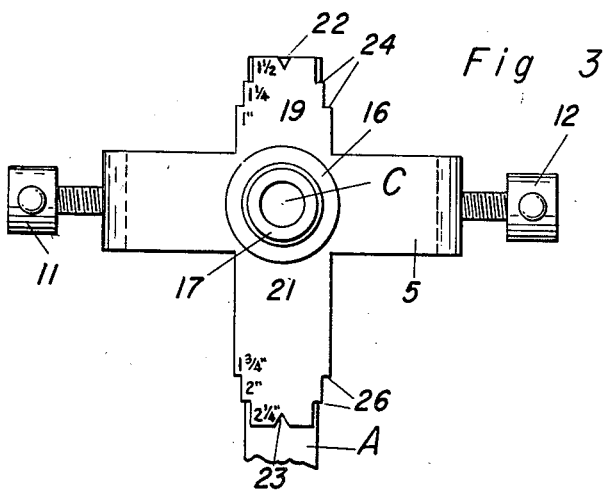
Fig. 3 is a top plan view of Fig. 1.
Figure 4:
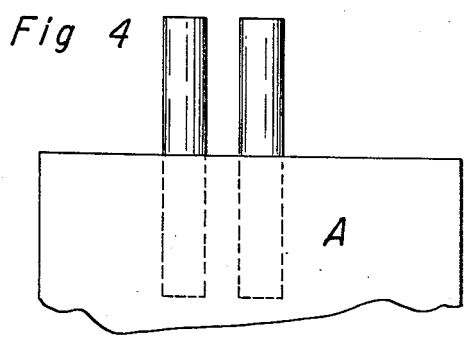
Fig. 4 is a fragmentary view showing dowels positioned in a piece of lumber.
Figure 5:
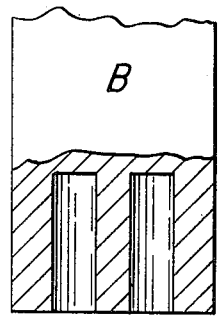
Fig. 5 shows dowel openings in a piece of lumber adapted to be engaged by the dowels of Fig. 4.

By viewing Fig. 3, it will be noted that I have provided a pair of gauge arms 19 and 21, each of which arms has a V-shaped groove as shown at 22 and 23, respectively and also a series of steps 24 and 26, respectively. These steps are located a definite distance from the center point C of the gauge, so that when the center point is one inch from the first step, the dowel hole being drilled will be exactly centered one inch from the end of the board if it is in alignment with these first steps. If the second step is designated at one and one-quarter inches, then the center will be one and one-quarter inches away from the end. Therefore, by placing the end of the board adjacent one of the gauge marks, a definite location is readily obtained.

Assuming that it is desired to fasten together two pieces of material as shown at A and B, the part A is clamped, as shown in Fig. 1, so that a center line formed on the top of the part is in alignment with the grooves 22 and 23. One of the clamps is now slightly loosened and the end of the board is moved to one of the gauge marks, 24 or 26, as the case may be, and a drill tube having a internal bore suitable for the size of the dowel to be used is placed in the device, after which a drill is inserted in the drill tube and a socket bored for the dowel.

The same procedure is employed in boring the piece B. After both pieces have been bored, the dowels are inserted with the assurance that the two parts will fit together properly.

It will thus been seen that my device will accomplish all of the objects above set forth. It is to be understood that the form of my invention herewith shown and described is to be taken as a preferred example of the same and that various changes relative to the material, size, shape and ararngement of parts may be resorted to without departing from the spirit of the invention or the scope of the subjoined claim.

Having thus described my invention, I claim:

A dowel gauge comprising a U-shaped member having downwardly extending legs, clamping members rotatably carried by said legs, a removable drill tube threadedly engaging said U-shaped member and extending outwardly therefrom, whereby a drill passing through said tube will engage work secured by said clamping members, gauge arms extending from said U-shaped member and in the same plane therewith, said gauge arms having steps formed in the sides thereof to determine the distance from the center of said drill tube in either direction.

References Cited in the file of this patent

UNITED STATES PATENTS

| | | |
|---|---|---|
| 891,606 | Doldt et al. | June 23, 1908 |
| 1,161,479 | Kelley | Nov. 23, 1915 |